United States Patent
Chung et al.

(10) Patent No.: US 12,296,424 B2
(45) Date of Patent: May 13, 2025

(54) CONTROL SYSTEM FOR NORMALLY-ON POWER TOOL

(71) Applicant: TECHTRONIC CORDLESS GP, Anderson, SC (US)

(72) Inventors: Koon For Chung, Kwai Chung (CN); Yan Jia Wang, Kwai Chung (CN)

(73) Assignee: TECHTRONIC CORDLESS GP, Anderson, SC (US)

(*) Notice: Subject to any disclaimer, the term of this patent is extended or adjusted under 35 U.S.C. 154(b) by 219 days.

(21) Appl. No.: 17/679,186

(22) Filed: Feb. 24, 2022

(65) Prior Publication Data
US 2023/0264313 A1    Aug. 24, 2023

(30) Foreign Application Priority Data

Mar. 3, 2021   (CN) .......................... 202110233320.1

(51) Int. Cl.
| | |
|---|---|
| *B23Q 15/20* | (2006.01) |
| *A01G 3/00* | (2006.01) |
| *B02C 25/00* | (2006.01) |
| *B27L 11/02* | (2006.01) |

(52) U.S. Cl.
CPC ............. *B23Q 15/20* (2013.01); *A01G 3/002* (2013.01); *B02C 25/00* (2013.01); *B27L 11/02* (2013.01)

(58) Field of Classification Search
CPC .......... B23Q 15/20; B02C 25/00; A01G 3/00; A01G 3/002; A01G 3/033; A01G 3/0335; A01G 3/037
See application file for complete search history.

(56) References Cited

U.S. PATENT DOCUMENTS

| | | |
|---|---|---|
| 2,004,737 A | 6/1935 | Tonks |
| 5,044,270 A | 9/1991 | Schwelling |
| 5,836,528 A | 11/1998 | Hilgarth |

(Continued)

FOREIGN PATENT DOCUMENTS

| | | |
|---|---|---|
| CN | 1717979 A | 1/2006 |
| CN | 101462088 | 6/2009 |

(Continued)

OTHER PUBLICATIONS

Translation of KR-102150688 (Year: 2020).*

(Continued)

*Primary Examiner* — Bobby Yeonjin Kim
(74) *Attorney, Agent, or Firm* — Dority & Manning, P.A.

(57) ABSTRACT

Disclosed in the present invention is a control system for a normally-on power tool. The power tool comprises a tool head and a power device for providing the tool head with power, and the control system comprises an acquisition circuit and a control circuit. The acquisition circuit is in electrical communication with the power device and used to acquire at least one parameter associated with the power device, and the control circuit is configured to put the power device in a working mode with a first output power or a standby mode with a second output power according to the at least one parameter. The control system according to one or more embodiments of the present invention can save energy consumption, reduce mechanical wear, increase the service life of the power tool, and enhance operation convenience and safety.

15 Claims, 7 Drawing Sheets

(56) References Cited

U.S. PATENT DOCUMENTS

| | | | |
|---|---|---|---|
| 7,011,258 B2 | 3/2006 | O'Halloran | |
| 7,222,804 B2 | 5/2007 | Wolf et al. | |
| 7,538,503 B2 | 5/2009 | Machens | |
| 7,671,557 B2 | 3/2010 | Maeda | |
| 9,024,554 B2 | 5/2015 | Yun | |
| 9,425,728 B2 | 8/2016 | Valenti | |
| 9,825,572 B2 | 11/2017 | Fujinami | |
| 9,866,153 B2 | 1/2018 | Kusakawa | |
| 9,923,492 B2 | 3/2018 | Chen | |
| 9,936,634 B2 | 4/2018 | Yang | |
| 10,272,440 B2 | 4/2019 | Lietaer | |
| 10,469,013 B2 | 6/2019 | Sakamoto | |
| 10,695,771 B2 | 6/2020 | Friz | |
| 10,972,034 B2 | 4/2021 | Kunzel | |
| 2007/0034295 A1* | 2/2007 | Chapman | B02C 18/2283 144/373 |
| 2007/0170289 A1 | 7/2007 | Okada | |
| 2007/0290083 A1* | 12/2007 | Abramson | B02C 18/0007 241/36 |
| 2013/0037637 A1* | 2/2013 | Chen | B02C 18/0007 241/36 |
| 2013/0186661 A1 | 7/2013 | Okubo | |
| 2014/0333237 A1* | 11/2014 | Stockstill | H02J 9/061 318/139 |
| 2018/0297038 A1 | 10/2018 | Costello | |
| 2018/0345433 A1 | 12/2018 | Sudo | |
| 2019/0288632 A1 | 9/2019 | Wang | |
| 2020/0076337 A1 | 3/2020 | Abbott | |
| 2020/0129988 A1 | 4/2020 | Doppstadt | |
| 2020/0230718 A1* | 7/2020 | Ding | B27B 9/00 |
| 2020/0412294 A1 | 12/2020 | Cox | |
| 2021/0046486 A1* | 2/2021 | Runyon | B02C 18/24 |
| 2021/0083616 A1 | 3/2021 | Yoneda | |

FOREIGN PATENT DOCUMENTS

| | | | |
|---|---|---|---|
| CN | 101462091 | 6/2009 | |
| CN | 201394490 | 2/2010 | |
| CN | 201493151 | 6/2010 | |
| CN | 101791585 | 8/2010 | |
| CN | 101791585 B | 8/2010 | |
| CN | 20159127 U | 9/2010 | |
| CN | 201659014 U | 12/2010 | |
| CN | 201906646 | 7/2011 | |
| CN | 102152283 B | 8/2011 | |
| CN | 102114438 B | 6/2012 | |
| CN | 20291380 U | 5/2013 | |
| CN | 103182338 A | 7/2013 | |
| CN | 102500456 B | 10/2013 | |
| CN | 103418468 | 12/2013 | |
| CN | 203722531 U | 7/2014 | |
| CN | 10353734 B | 4/2015 | |
| CN | 105408074 B | 3/2016 | |
| CN | 105515489 B | 4/2016 | |
| CN | 106357190 B | 1/2017 | |
| CN | 106391243 B | 2/2017 | |
| CN | 206351169 U | 7/2017 | |
| CN | 206547323 U | 10/2017 | |
| CN | 108465545 A | 8/2018 | |
| CN | 108496526 A | 9/2018 | |
| CN | 108614498 A | 10/2018 | |
| CN | 208077043 U | 11/2018 | |
| CN | 208098294 U | 11/2018 | |
| CN | 109067293 A | 12/2018 | |
| CN | 208482616 U | 2/2019 | |
| CN | 109981020 A | 7/2019 | |
| CN | 110449234 A | 11/2019 | |
| CN | 209582579 U | 11/2019 | |
| CN | 110739890 A | 1/2020 | |
| CN | 111346722 A | 6/2020 | |
| CN | 111346725 A | 6/2020 | |
| CN | 111450954 A | 7/2020 | |
| CN | 111478635 A | 7/2020 | |
| CN | 211701901 U | 10/2020 | |
| CN | 111922037 A | 11/2020 | |
| CN | 112091898 A | 12/2020 | |
| CN | 112422011 A | 2/2021 | |
| DE | 4431173 A1 | 3/1996 | |
| DE | 29514085 U1 | 1/1997 | |
| DE | 202010012577 U1 | 1/2011 | |
| DE | 202020002588 U1 | 7/2020 | |
| EP | 505702 A1 | 9/1992 | |
| EP | 630686 B1 | 12/1994 | |
| EP | 1198871 B1 | 4/2002 | |
| EP | 1724209 A1 | 11/2006 | |
| EP | 2071936 A1 | 6/2009 | |
| EP | 2072137 | 6/2009 | |
| EP | 2072140 A1 | 6/2009 | |
| EP | 2165766 B1 | 3/2010 | |
| EP | 2613680 B1 | 7/2013 | |
| EP | 2668839 A1 | 12/2013 | |
| EP | 2859952 A1 | 4/2015 | |
| EP | 3124223 B1 | 2/2017 | |
| FR | 2631778 A1 | 1/1989 | |
| GB | 1428133 | 3/1976 | |
| GB | 2473508 A | 3/2011 | |
| KR | 102150688 B1 * | 9/2020 | A01D 34/76 |
| WO | WO12094818 | 7/2012 | |
| WO | WO2012175901 A1 | 12/2012 | |
| WO | WO2013058653 A1 | 4/2013 | |
| WO | WO2019168487 A2 | 9/2019 | |
| WO | WO2020030468 A1 | 2/2020 | |
| WO | WO2021025620 A1 | 2/2021 | |

OTHER PUBLICATIONS

International Search Report Corresponding to Application No. PCT/CN2021/119104 on Sep. 17, 2021 (7 pages).
Canadian Office Action Corresponding with Application No. 3,142,751 on Feb. 10, 2023 (1 page).
Canadian Office Action Corresponding with Application No. 3,142,752 on Feb. 14, 2023 (1 page).
European Search Report Corresponding with Application No. EP21212224 Oct. 25, 2022 (6 pages).
European Search Report Corresponding with Application No. EP22153396 on Jun. 30, 2022; (1 page).
European Search Report Corresponding with Application No. EP21211850 on May 12, 2022; (1 page).

* cited by examiner

CONTROL SYSTEM FOR NORMALLY-ON POWER TOOL

This application claims the benefit of priority to Chinese Patent Application No. 202110233320.1, filed on Mar. 3, 2021, the disclosure of which is incorporated by reference herein in its entirety.

TECHNICAL FIELD

The present invention relates to the field of battery-powered power tools, and more specifically to a control system for a normally-on power tool.

BACKGROUND ART

There are a variety of battery-powered power tools. The power tools may be powered by power systems, and the power systems may be powered by batteries. In general, a switch device triggers a power tool to make it start working while consuming power or electricity. It is usually necessary to control the power tools. In the prior art, there is usually a problem of improper control, which will cause unnecessary consumption of electricity, and also cause mechanical deterioration of power tools while causing some safety problems.

BRIEF SUMMARY OF THE INVENTION

In view of one or more technical shortcomings of the prior art, the present invention provides a control system for a power tool.

According to an aspect of the present invention, there is provided a control system for a power tool. The power tool comprises a tool head and a power device for providing the tool head with power, and the control system comprises an acquisition circuit and a control circuit. The acquisition circuit is in electrical communication with the power device and used to acquire at least one parameter associated with the power device, and the control circuit puts the power device in a working mode with a first output power or a standby mode with a second output power according to the at least one parameter.

Alternatively or additionally, the acquisition circuit comprises one or more of a current sensor, a voltage sensor, a power sensor, and a speed sensor, and the at least one parameter comprises one or more of a current, an output power, and a rotational speed of the power device.

Alternatively or additionally, in the working mode, the power device has a current in a range of 8 A to 50 A, an output power in a range of 230 W to 1050 W, and a rotational speed in a range of 30 RPM to 45 RPM.

Alternatively or additionally, in the standby mode, the power device has a current in a range of 2 A to 5 A, an output power in a range of 58 W to 144 W, and a rotational speed in a range of 15 RPM to 25 RPM.

Alternatively or additionally, the control system further comprises a timing circuit configured to monitor a time value associated with the at least one parameter, and the control circuit puts the power device in the working mode or the standby mode according to the at least one parameter and the time value.

Alternatively or additionally, the acquisition circuit is configured to continuously acquire the at least one parameter of the power device in the working mode, and intermittently acquire the at least one parameter of the power device in the standby mode.

Alternatively or additionally, the control system is configured to detect at least one state of the power tool that is different from the at least one parameter, and the control circuit is configured to switch the power tool from the standby mode to the working mode based on the at least one state.

Alternatively or additionally, the control system is configured to detect at least one state of the power tool, and the control circuit is configured to switch the power tool from the standby mode to the working mode based on the at least one state before the at least one parameter changes.

Alternatively or additionally, the control system further comprises a feed sensor configured to monitor whether a material enters a feed port of the power tool.

Alternatively or additionally, the control system further comprises a load indicator for indicating a load capacity of the power tool.

Alternatively or additionally, the control system is configured to cause the load indicator to indicate a low load capacity within a predetermined time when the power device starts to switch from the standby mode to the working mode.

Alternatively or additionally, the control system is configured to cause the load indicator to indicate a low load capacity within a predetermined time from detection of the at least one state of the power tool by the control system.

Alternatively or additionally, the control system is configured to detect one or more of the following items of the tool head of the power tool: total number of operating revolutions, total operating mileage, and total operating time; and the control circuit determines whether the tool head needs to be replaced according to the detection of the tool head of the power tool.

Alternatively or additionally, the control system further comprises an indication circuit configured to indicate the at least one state, and preferably, the control system further comprises an alarm circuit configured to issue an alarm signal in one or more of the at least one state, wherein the alarm signal is a visual signal, a sound signal, or a combination of the two.

Alternatively or additionally, the power tool is a branch shredder.

The control system for the normally-on power tool according to one or more embodiments of the present invention has a number of advantages. For example, the control system according to one or more embodiments of the present invention can put the power tool in different operation modes according to its state parameter, so that when the power tool does not need to be operated, power or electricity can be saved while reducing unnecessary use and deterioration of the power tool and also improving safety, which can also increase the service life of the power tool. For example, the control system according to one or more embodiments of the present invention can monitor a fault state of the power tool in time, so that it can be responded to in time, improving operation convenience and safety.

More embodiments and beneficial technical effects of the present invention will be described in detail below.

DETAILED DESCRIPTION OF THE PREFERRED EMBODIMENTS

In order to facilitate the understanding of the present invention, a number of exemplary embodiments will be described below with reference to related drawings.

Figure 1:
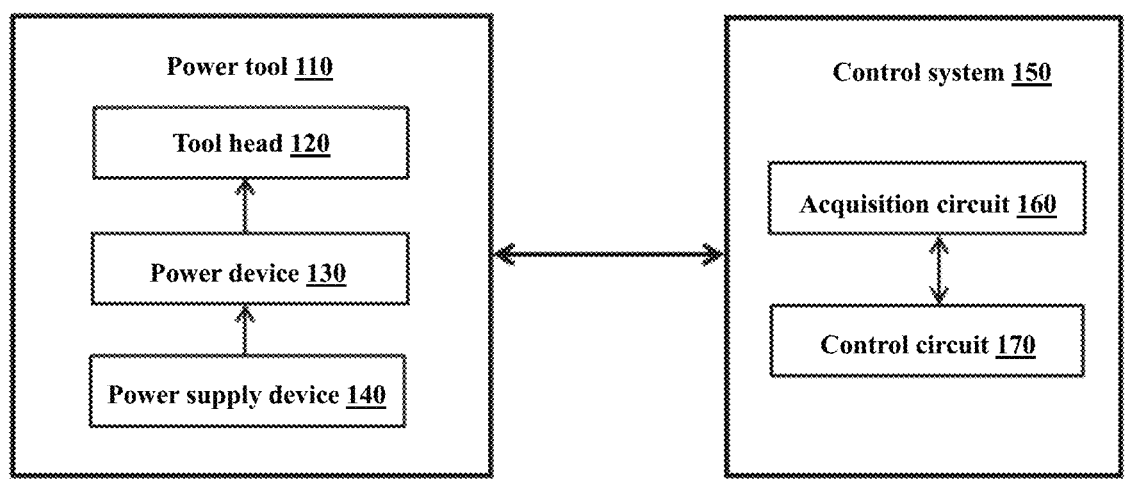
FIG. 1 shows a schematic diagram of a control system according to some embodiments of the present invention.

According to an aspect of the present invention, FIG. 1 shows a schematic diagram of a control system according to some embodiments of the present invention.

FIG. 1 shows a schematic diagram of modules of a power tool 110. The power tool 110 can be used to perform an operation on an operation object, thereby promoting the saving of manpower for example. The power tool 110 is, for example, an electric tool or other suitable types of power tools. The embodiments of the present invention mainly focus on electric tools that use batteries as power sources, but are also applicable to power tools that use other power sources (e.g. gasoline or AC power supply). Among many power tools 110, there is a type of "normally-on" power tools. The so-called normally-on power tool means that as long as a user operates an activation switch, the power tool can maintain operation without the user's continuous operation of the activation switch. Such power tools comprise, for example, branch shredders and the like. In contrast, a non-normally-on power tool requires the user to maintain the operation of the activation switch of the power tool in order to maintain operation. This is often for the purpose of security. Such power tools comprise, for example, hedge trimmers, electric saws, and the like.

In a normally-on power tool, although the power tool maintains operation, it does not effectively output at every moment. Taking a branch shredder as an example, the user may leave for a short time without feeding the branches to perform shredding operations. At this time, maintaining full power output will result in waste of electricity. For battery-driven normally-on power tools, this means shortened working time. For this reason, the power tool of the present invention is intended to avoid such waste of electricity, and thus prolong the effective working time of the power tool.

As shown in FIG. 1, the power tool 110 comprises a tool head 120, a power device 130, and a power supply device 140. The tool head 120 is used to perform an operation on an operation object. The term "tool head" herein should be understood in a broad sense. The tool head 120 may be, for example, a cutting knife, a drill bit, a spray head, or other types of operating accessories, etc., and achieve the desired purpose by directly acting on the operation object (e.g. branches, shrubs, flowers, soil, sheet material, etc.).

The power device 130 is used to provide the tool head 120 with power. The power device 130 comprises, for example, a motor, or a combination of the motor and its corresponding transmission mechanism and output mechanism. The power supply device 140 is used to provide the power device 130 with electricity. The power supply device 140 is, for example, a battery pack. The power supply device 140 may also be a direct current power supply or an alternating current (AC) power grid that is electrically connected to the power device 130 in a wired or wireless manner.

The control system 150 is in electrical communication with the power tool 110. For example, it is connected to the power tool 110 in a wired or wireless manner, so that the power tool 110 can be manipulated. The control system 150 may be installed on the power tool 110 (for example, installed on a housing or arranged inside the housing), or may also be arranged independently of the power tool 110.

As illustrated in FIG. 1, the control system 150 comprises an acquisition circuit 160 and a control circuit 170. The acquisition circuit 160 is electrically connected to the power tool 110 and is used to acquire at least one parameter of the power tool 110. The control circuit 170 puts the power tool 110 in a first mode or a second mode according to the acquired at least one parameter. The first mode has a first output power, for example, and the second mode has a second output power, for example. The first output power is different from the second output power.

The at least one parameter may, for example, be associated with an operation state of the power tool 110, and the operation state comprises, for example, whether the power tool 110 is performing an operation on the operation object. In some embodiments, the at least one parameter may for example be associated with the power device 130. For example, it may indicate an operating state or load state of the power device 130. The at least one parameter comprises one or more of a current, an output power, and a rotational speed of the power device 130, for example.

In many cases, the operating state of the power tool is associated with (for example, consistent with) the operating state of the power device. For example, a no-load state of the power device also means a no-load state of the power tool. Therefore, the expressions "at least one parameter of the power tool" and "at least one parameter of the power device" herein have the same meaning in many cases. In some cases, "at least one parameter of the power tool" may have a broader meaning, that is, it may refer to a parameter associated with another component of the power tool. Herein, the term "mode of the power tool" or similar is used interchangeably with the term "mode of the power device" or similar in many cases.

The first mode is, for example, a working mode, and the second mode is, for example, a standby mode. For example, when the acquired at least one parameter indicates that the power tool 110 or the power device 130 is at no load or a low load, the control circuit 170 may put the power tool 110 or the power device 130 in the standby mode. In the standby mode, the power device 130 is in a second state. In this state, the current drawn by the power device will be significantly reduced, and the rotational speed and output power will also be significantly reduced. In some embodiments, in the second state, the current drawn by the power device 130, the output power, and the rotational speed are all reduced to zero. Therefore, the standby mode can greatly save electricity consumption. In addition, mechanical wear or deterioration of the power device 130 is also reduced, which is also advantageous for increasing the service life of the power device. At the same time, safety is also increased, and accidental injuries to people caused by unnecessary operating of the power device 130 can be avoided.

When the acquired at least one parameter indicates that the load of the power tool 110 or the power device 130 is increased, the control circuit 170 can wake up the power tool 110 or the power device 130 and put it in the working mode. In the working mode, the power device 130 is in a first state. In this state, the current drawn by the power device, the rotational speed, and the output power are significantly increased. Thus, the tool head 120 can be provided with the desired power to act on the operation object.

In some embodiments, the power tool may be, for example, a branch shredder, and the power device may, for example, comprise a motor. In the working mode, the current drawn by the motor is in a range of 8 A to 50 A, such as 8 A, 10 A, 15 A, 20 A, 25 A, 30 A, 40 A, 45 A or 50 A; the output power is in a range of 230 W to 1050 W, such as 230 W, 300 W, 400 W, 500 W, 600 W, 700 W, 760 W, 800 W, 950 W or 1050 W; and the rotational speed is in a range of 30 RPM to 45 RPM, such as, 30 RPM, 35 RPM, 40 RPM or 45 RPM. In the standby mode, the current drawn by the motor is in a range of 2 A to 5 A, such as 2 A, 2.5 A, 3 A, 3.5 A, 4 A, 4.5 A or 5 A, the output power is in a range of 58 W to 144 W, such as 58 W, 65 W, 75 W, 90 W, 100 W, 110 W, 120 W, 130 W or 144 W; and the rotational speed is in a range of 15 RPM to 25 RPM, such as 15 RPM, 18 RPM, 20 RPM, 23 RPM or 25 RPM. It can be seen that when the power tool is not required to work, switching and maintaining it in the standby mode can greatly save electricity consumption. In addition, those skilled in the art should understand that these numerical values are exemplary, and the corresponding numerical ranges may be different for different types of power tools. For the same type of power tools, it is also possible to design these for different types of operation objects (taking branch shredders as an example, for example, for branches of different thicknesses), and therefore, the corresponding numerical ranges may also be different.

The acquisition circuit 160 may continuously acquire at least one parameter of the power tool 110, for example, or may intermittently acquire it. In some embodiments, in the working mode, the acquisition circuit 160 continuously acquires at least one parameter of the power device 130, and in the standby mode, the acquisition circuit 160 intermittently (for example, periodically) acquires at least one parameter of the power device 130. In the working mode, the power device will consume a lot of energy (e.g. electricity). Therefore, for the continuous or real-time acquisition, it is advantageous that the power device can be switched to the standby mode in time (e.g. immediately) when the operation object does not need to be processed. In the standby mode, the energy consumption is less, and for normal scenarios, a short-time (e.g., a few hundred millimeters, 1-5 seconds, etc.) delayed wake-up is acceptable and will not cause a significant impact. Therefore, the intermittent parameter acquisition can be used. Parameter acquisition itself consumes energy, and therefore, such a setting can further reduce energy consumption.

Figure 2:
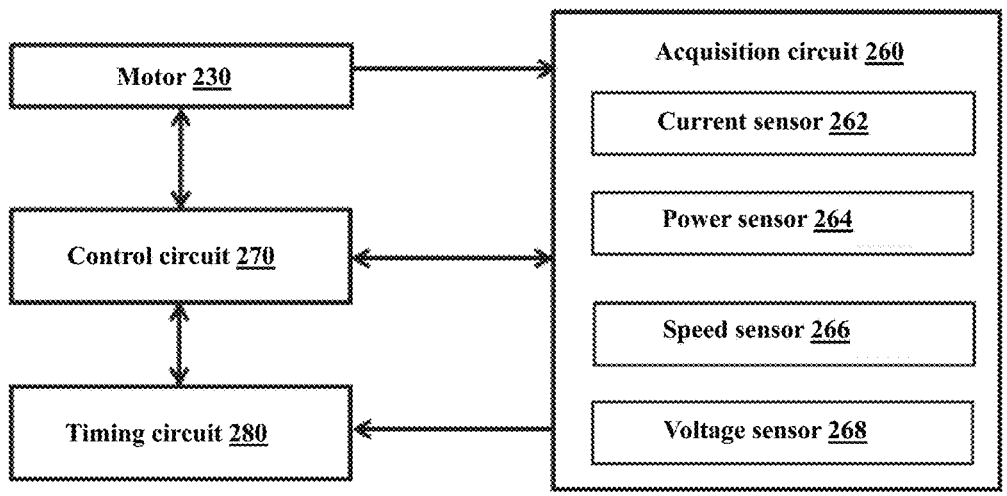
FIG. 2 shows a schematic diagram of a control system according to other embodiments of the present invention.

FIG. 2 shows a schematic diagram of a control system according to other embodiments of the present invention. For the sake of brevity, FIG. 2 does not illustrate the entire power tool. In FIG. 2, the power device of the power tool is illustrated as a motor 230, and the motor 230 may be, for example, a specific implementation of the power device 130 in FIG. 1.

The acquisition circuit 260 comprises at least one of a current sensor 262, a power sensor 264, a speed sensor 266, and a voltage sensor 268. This is for illustrative purposes only. In some embodiments, the acquisition circuit 260 may comprise fewer sensors or more sensors. For example, it may comprise more other types of sensors. Herein, the term "sensor" should be understood in a broad sense. It may be a discrete electronic component, or may be a circuit module composed of a plurality of electronic components through appropriate configuration, so as to perform the purpose of detecting, sensing, monitoring, acquiring or collecting one or more physical parameters.

The acquisition circuit 260 is in electrical communication with the motor 230 to acquire one or more parameters associated with the motor 230, thereby directly or indirectly indicating a state such as a load state of the motor 230. For example, the current sensor 262 can be used to acquire a current flowing through the motor 230. The power sensor 264 can be used to acquire an output power of the motor 230 (for example, a power outputted to the tool head). The speed sensor 266 can be used to acquire a rotational speed of the motor 230. The voltage sensor 268 may be used to acquire a voltage associated with the motor 230.

The control circuit 270 receives one or more parameters acquired by the acquisition circuit 260, and then decides to put the motor 230 in one of a first mode (e.g., working mode) and a second mode (e.g., standby mode) based on these parameters. For example, in some embodiments, when a first condition is met, the motor 230 is caused to automatically enter the standby mode, and when a second condition is met, the motor 230 is caused to automatically wake up from the standby mode. The first condition and the second condition can be set according to actual needs, and those skilled in the art will understand their meaning more clearly after reading one or more examples below.

For example, the control circuit 270 obtains a load state such as a no-load or low-load state and a normal-load or high-load state of the motor 230 by analyzing the acquired parameter. If it is the no-load or low-load state, then this indicates that there is no operation object to be processed and the motor is not expected to work. If it is the normal-load or high-load state, then this indicates that the motor is expected to work to provide the tool head with power to process the operation object. When no load or a low load is indicated, the control circuit 270 can continue to maintain the motor 230 in the standby mode or switch it from the working mode to the standby mode. When a normal load or high load is indicated, the control circuit 270 can continue to maintain the motor 230 in the working mode or wake it up from the standby mode.

In some embodiments, the control circuit 270 may obtain an indication of the load state of the motor by comparing a parameter value of the parameter with a corresponding parameter threshold. For example, when the current drawn by the motor 230 is equal to or lower than a first current threshold, the no-load or low-load state may be indicated. When the current drawn by the motor 230 is greater than a second current threshold, the normal-load or high-load state may be indicated. The first current threshold and the second current threshold may be different. For another example, when the output power of the motor 230 is equal to or lower than a first power threshold, the no-load or low-load state may be indicated. When the output power of the motor 230 is greater than a second power threshold, the normal-load or high-load state may be indicated. The first power threshold and the second power threshold may be different. For another example, when the rotational speed of the motor 230 is equal to or greater than a first rotational speed threshold, the no-load or low-load state may be indicated. When the rotational speed of the motor 230 is lower than a second rotational speed threshold, the normal-load or high-load state may be indicated. The first rotational speed threshold and the second rotational speed threshold may be different. For still another example, when the voltage associated with the motor 230 is equal to or lower than a first voltage threshold, the no-load or low-load state may be indicated. When the voltage associated with the motor 230 is greater than a second voltage threshold, the normal-load or high-load state may be indicated. The first voltage threshold and the second voltage threshold may be different.

In some embodiments, in order to further improve the accuracy of determination, the determination can be made based on a combination of at least two parameters, for example, according to both the comparison of the current and the current threshold, and the comparison of the output power and the power threshold. For example, the no-load or low-load state is indicated only when the current drawn by the motor 230 is equal to or lower than the current threshold, and at the same time, the output power of the motor 230 is equal to or lower than the power threshold. Such a combination may also be a combination of two, three, four or more of the current, output power, rotational speed, voltage, or other suitable parameters.

These parameter thresholds, such as current threshold, voltage threshold, power threshold, rotational speed threshold, etc., can be preset according to actual needs. For different types of power tools, power devices, etc., these parameter thresholds may be different. For example, even for the same type of power tools, if the motor models are different, the corresponding parameter thresholds may be different. In the following example of the branch shredder, some specific parameter thresholds will be illustrated. According to some embodiments, in FIG. 2, the control system further illustratively comprises a timing circuit 280. The timing circuit 280 is in electrical communication with the acquisition circuit 260 and the control circuit 270 for detecting or monitoring a time value related to at least one parameter associated with the motor 230. The time value indicates the time during which the at least one parameter continuously meets a certain condition, for example, the time during which the parameter maintains a parameter value or remains in a numerical value range.

The time value is, for example, the time during which the current drawn by the motor 230 continues to meet condition A of being equal to or lower than the current threshold. The time value is, for example, the time during which the output power of the motor 230 continues to meet condition B of being equal to or lower than the power threshold. The time value is, for example, the time during which the rotational speed of the motor 230 continues to meet condition C of being equal to or greater than the rotational speed threshold. The time value is, for example, the time during which the voltage associated with the motor 230 continues to meet condition D of being equal to or lower than the voltage threshold.

In some embodiments, the time value is, for example, the time during which any two of condition A, condition B, condition C, and condition D are met at the same time, the time during which any three of these conditions are met at the same time, or the time during which all four conditions are met at the same time.

The control circuit 270 compares the time value received from the timing circuit 280 with a time threshold. The time threshold is, for example, in a range of 1 second to 300 seconds, such as 1 second, 5 seconds, 10 seconds, 60 seconds, 180 seconds, 220 seconds, 280 seconds or 300 seconds.

The control circuit 270 puts the motor 230 in the first mode or the second mode or switches it from one mode to another mode according to the acquired at least one parameter and the time value. For example, only when the comparison of the at least one parameter value and the corresponding parameter threshold meets a specific preset condition, and the time value is equal to or greater than the time threshold, will the control circuit 270 continue to maintain the motor 230 in the standby mode or switch it from the working mode to the standby mode, otherwise, according to the mode which the motor 230 is in, it will jump to the working mode (if the mode which it is in is the standby mode) or continue to maintain the working mode (if the mode which it is in is the working mode).

In the working process of the power tool, a temporary no-load or low-load state may occur due to various reasons, such as unevenness and discontinuity of the operation object, intermissions caused by the operator due to human reasons (e.g., stopping to communicate with other people, lighting cigarettes, etc.), or other reasons. In this case, the control system may put the power tool or the power device in the standby mode according to the determination, which is undesirable.

When the power tool or the power device is in the standby mode, the operator or other people may, for example, accidentally touch the power device, such as accidentally touching the tool head, or even moving or rotating the tool head. If the control system thus determines that the load increases and switches the power tool to the working mode, it may cause danger.

Therefore, it is advantageous for the control system to include a timing circuit, which can more desirably put the power tool or the power device in a desired mode, avoiding or reducing undesired mode switching, such as avoiding or reducing the undesired situations illustrated above. This can further improve the operation accuracy, convenience, and safety.

Figure 3:
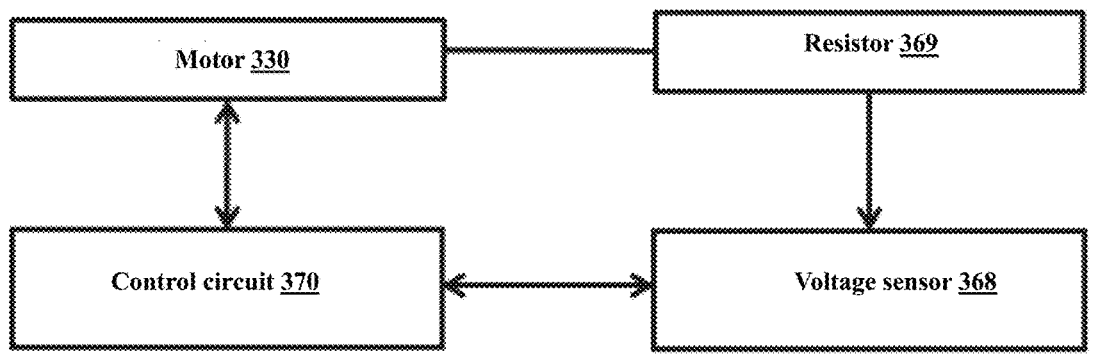
FIG. 3 shows a schematic diagram of a system for detecting a voltage associated with a motor according to some embodiments of the present invention.

FIG. 3 shows a schematic diagram of a system for detecting a voltage associated with a motor according to some embodiments of the present invention. FIG. 3 illustrates a motor 330, a resistor 369, a control circuit 370, and a voltage sensor 368. The motor 330, the control circuit 370, and the voltage sensor 368 may be, for example, corresponding specific implementations that correspond to the motor 230, the control circuit 270, and the voltage sensor 268 shown in FIG. 2, respectively.

As illustrated in FIG. 3, the resistor 369 is connected in series with the motor 330, and therefore, the current flowing through the two is the same. When the motor 330 has no load or a low load, the current drawn decreases, and therefore a voltage between terminals of the resistor 369 decreases accordingly. Therefore, the voltage sensor 368 detects the terminal voltage of the resistor 369, which can indirectly indicate the load state of the motor 330.

For example, when the terminal voltage of the resistor 369 is equal to or less than a preset voltage threshold, it may be indicated that the motor 330 is in a no-load or low-load state. For example, when the terminal voltage of the resistor 369 is equal to or less than a preset voltage threshold for a time threshold (e.g., 1 second, 5 seconds, 10 seconds, 60 seconds, 180 seconds, 220 seconds, 280 seconds, or 300 seconds), etc., it may be indicated that the motor 330 is in the no-load or low-load state.

In some cases, it is advantageous to use the resistor illustrated in FIG. 3 for indicating the load state. It does not need to test the motor directly. The resistor can be arranged separately from the motor 330. This is desirable in some cases. For example, the space where the motor is located may be very compact and inconvenient for testing, and thus the resistor may be put in other allowable spaces, which provides convenience. Moreover, the resistance value of the resistor can be selected in a wide range according to actual needs (e.g., 200 ohms to 10,000 ohms, 500 ohms to 2000 ohms, 1,000 ohms to 100,000 ohms, etc.), and this flexibility is also desired.

Figure 4A:
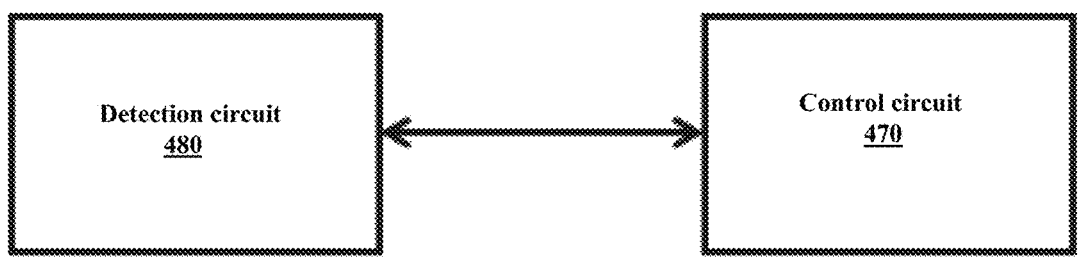
FIGS. 4A and 4B show schematic diagrams of a control system comprising a detection circuit according to still other embodiments of the present invention.
Figure 4B:
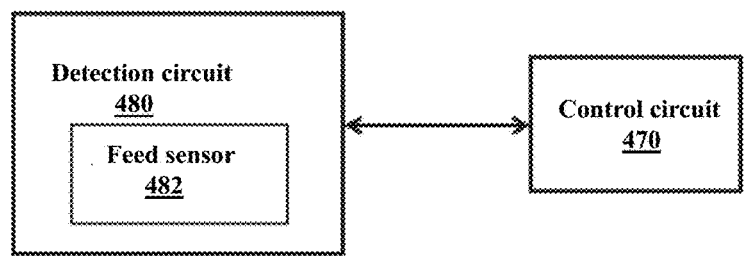

FIGS. 4A and 4B show schematic diagrams of a control system comprising a detection circuit according to still other embodiments of the present invention. FIG. 4A illustrates a control circuit 470. The control circuit 470 may be, for example, a specific implementation of one or more of the control circuit 170 shown in FIG. 1, or the control circuit 270 shown in FIG. 2, or the control circuit 370 shown in FIG. 3.

As illustrated, the detection circuit 480 and the control circuit 470 are electrically connected. The detection circuit 480 is in electrical communication with one or more other components of the power tool or a device for monitoring one or more components (e.g., a monitoring circuit such as sensor), for detecting or monitoring at least one state of the power tool.

In addition, the inventors have realized that when the power tool or the power device is restored from the standby mode to the working mode, a blockage phenomenon may occur. This is because it takes a process for the power tool or power device to be restored from the standby mode to the working mode, during which the output of the motor is gradually restored from zero power or a low power to a normal power. However, the increase in load may be faster than this process. Therefore, when the motor output cannot match the load, the blockage phenomenon may occur.

For this reason, it is envisaged in the present invention that the increase in load can be anticipated so as to restore the power tool or the power device from the standby mode to the working mode in advance to avoid blockage. For example, in some embodiments, the control system further detects at least one state of the power tool that is different from the at least one parameter (e.g., current, output power, rotational speed, etc.) illustrated above, and the control circuit switches the power tool from the standby mode to the working mode or from the working mode to the standby mode based on the at least one state. The at least one state is, for example, associated with the feed of the power tool. The at least one state indicates, for example, that the power tool is supplied with the feed.

In some other embodiments, the control system detects at least one state of the power tool, and the control circuit is configured to switch the power tool from the standby mode to the working mode based on the at least one state before at least one parameter changes. For example, the at least one state is, for example, associated with the feed of the power tool. The at least one state indicates, for example, that the power tool is supplied with the feed. The at least one parameter is, for example, the parameter illustrated above, such as one or more of the current, output power, rotational speed, etc. of the power device (e.g., motor). For example, in some embodiments, when it is detected that a material enters the power tool, the control system causes the power tool to switch the power tool from the standby mode to the working mode before the at least one parameter changes.

For example, in the example shown in FIG. 4B, the detection circuit 480 further comprises a feed sensor 482 for sensing the material entering the power tool. In some embodiments, the power tool comprises a feed device through which the material to be processed enters the interior of the power tool to be processed. The power tool of the present invention may comprise the feed sensor 482 coupled with the feed device. The feed sensor 482 may be one or more sensors for sensing when the material passes through the feed device. The one or more sensors are electrically connected to the detection circuit 480 or are arranged as a part of the detection circuit 480. Thus, once the material is detected to enter the feed device, the detection circuit 480 communicates with the control circuit 470, so that the control circuit 470 controls the power tool to quickly return to the working mode from the standby mode. In some embodiments, the feed sensor 482 is, for example, an optical sensor (e.g., infrared sensor, microwave sensor, etc.), an electromagnetic field sensor, or the like. For example, in some embodiments, an infrared sensor is arranged near a feed port of the power tool. When a material such as a tree branch enters the feed port, the infrared sensor can sense the entry of the material and generate a sensing signal. The control circuit can quickly wake up the power tool based on the sensing signal.

In some embodiments, the detection circuit 480 may be used to detect whether the tool head needs to be replaced, whether the power tool is blocked, over-loaded, over-current, over-heated or tilted, whether the remaining electricity quantity of the power supply device (e.g. battery pack) is too low, and so on. The control circuit 470 receives these state signals and processes them for determination. For example, for each state parameter, a corresponding state threshold may be preset, and the control circuit 470 may compare the received state parameter with the corresponding state threshold to determine a corresponding state and instruct that appropriate actions be performed, such as replacing the tool head, dealing with blockages, shutting down the power supply, charging the battery pack, or the like.

Figure 4C:
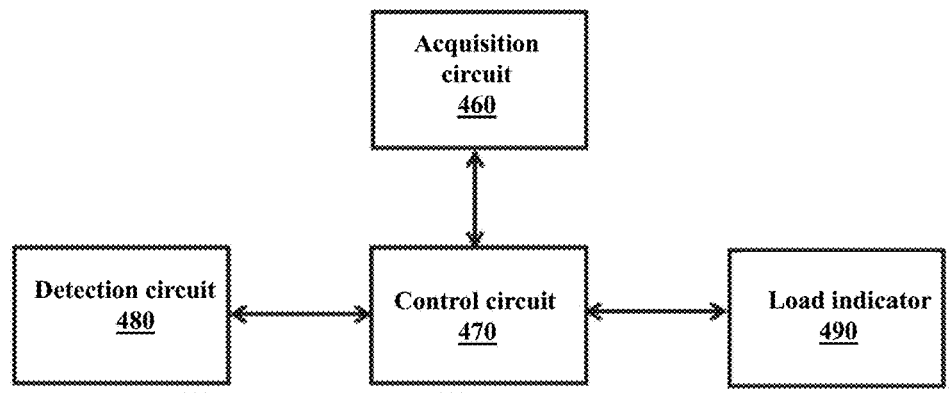
FIG. 4C shows a schematic diagram of a control system comprising a load indicator according to still other embodiments of the present invention.

In some embodiments, as illustrated in FIG. 4C, the control system further comprises a load indicator 490. The control circuit 470 can determine load conditions based on the information acquired by the acquisition circuit 460, and indicate the load capacity of the power tool by means of the load indicator 490. For example, the load indicator 490 may be arranged separately or as a part of a user interface of the power tool. For example, the load indicator 490 may be configured as a device capable of providing visual indications such as an LCD, LED or the like. In some embodiments, the load indicator 490 indicates the load capacity based on the current drawn by the power device (e.g., motor) of the power tool.

Figure 4D:
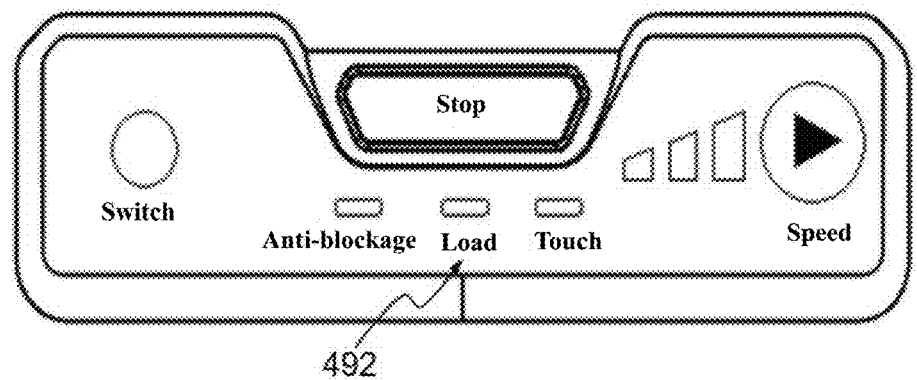
FIGS. 4D and 4E show a load indicator according to some embodiments of the present invention.

FIG. 4D illustrates a user interface. For example, as shown in FIG. 4D, the load indicator 490 is illustrated as an LED device 492 (e.g., LED bar indicator). If the motor current is relatively small, for example, less than 5 A, the LED device 492 is displayed in red, indicating that the load capacity is low, and the operator cannot fill the power tool with more material. If the motor current is relatively large, for example, greater than 8 A, the LED device 492 is displayed in green, indicating that the load capacity is high, and the operator can fill the power tool with more material.

In some embodiments, the load indicator indicates the low load capacity within a predetermined time when the power device starts to switch from the standby mode to the working mode. In other embodiments, the load indicator indicates the low load capacity within a predetermined time from detection of at least one state of the power tool (e.g., entry of material) by the control system. This can prevent the operator from starting to throw excessive material into the power tool before the power tool is fully started, causing blockage or damage to the power tool.

For example, when the power tool 110 is in the standby mode or is in the process of switching from the standby mode to the working mode, the LED device 492 is always displayed in red to indicate to the operator that the power tool cannot be filled with too much material at this time. Only when the power tool 110 is switched to the working mode, the LED device 492 is displayed in green, indicating to the operator that the material can be put in normally at this time.

It is advantageous for the control system to include a load indication function. For example, this can effectively avoid or alleviate load blockage of the power tool. For example, when the power tool is in the standby mode, the LED device is displayed in red, and the operator then knows that further filling with material is undesired. When the power tool wakes up from the standby mode to the working mode, the LED device will remain red for a period of time (e.g., 1 second, 5 seconds, or 10 seconds, etc.) until the power tool operates to a full load capacity or close to the full load capacity, and then the operator will know that the material can be put in according to the indication of the LED device. Thus, it is possible to prevent the operator from putting in the material when the load capacity of the power tool is insufficient, causing blockage of the tool.

The LED device 492 is only for the purpose of illustrating the load indicator 490. According to actual needs, the load indicator 490 can take various forms. For example, in FIG. 4E, the load indicator 497 comprises five LED devices arranged side by side. The five LED devices can construct different modes of patterns according to actual needs to indicate the load capacity. For example, the load capacity may be indicated according to the number of lit-up LED devices. For example, the five LED devices are all lit up to indicate the full load capacity, and all dimmed to indicate zero load capacity. For example, the five LED devices may be lit up in different colors, and each LED device (i.e., each color) indicates a preset corresponding level of load capacity. For another example, different load capacities may be made to correspond to different blinking patterns of LED devices. More indication schemes are also possible.

Figure 5:
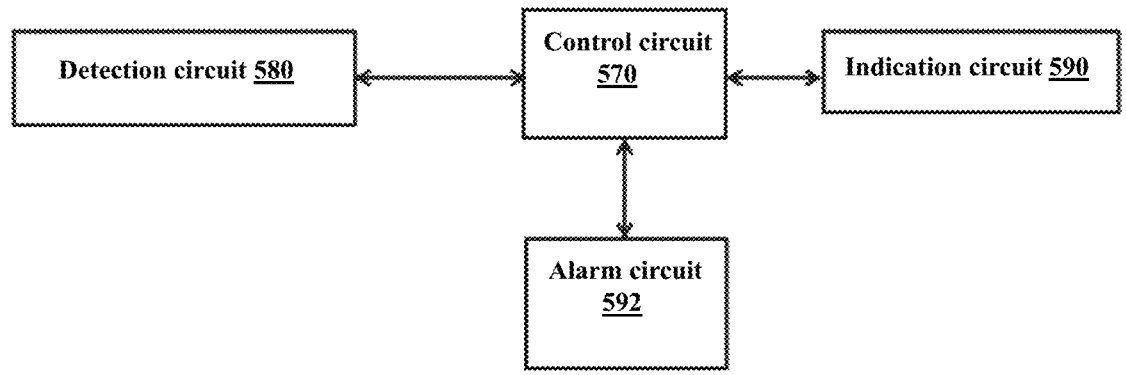
FIG. 5 shows a schematic diagram of a control system comprising a detection circuit, an indication circuit, and an alarm circuit according to still other embodiments of the present invention.

FIG. 5 shows a schematic diagram of a control system comprising a detection circuit, an indication circuit, and an alarm circuit according to still other embodiments of the present invention. As illustrated, the detection circuit 580 and the control circuit 570 may be, for example, specific implementations that correspond to the detection circuit 480 and the control circuit 470 shown in FIGS. 4A-4C, respectively.

Figure 4E:
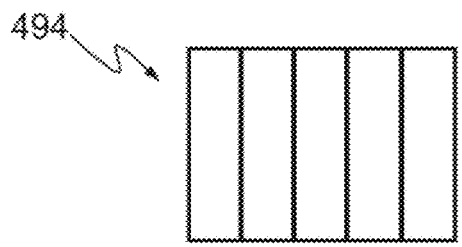

In FIG. 5, the control system further comprises an indication circuit 590 and an alarm circuit 592. The indication circuit 590 is used to indicate at least one state detected by the detection circuit 580, such as indicating that the tool head needs to be replaced, the power tool is over-loaded, over-current, over-heated or tilted to a certain angle, the remaining electricity quantity of the battery pack is below a electricity quantity threshold, and so on. In some embodiments, the indication circuit 590 further comprises a load indicator as illustrated in FIGS. 4C-4E for indicating the load capacity of the power tool.

Figure 6A:
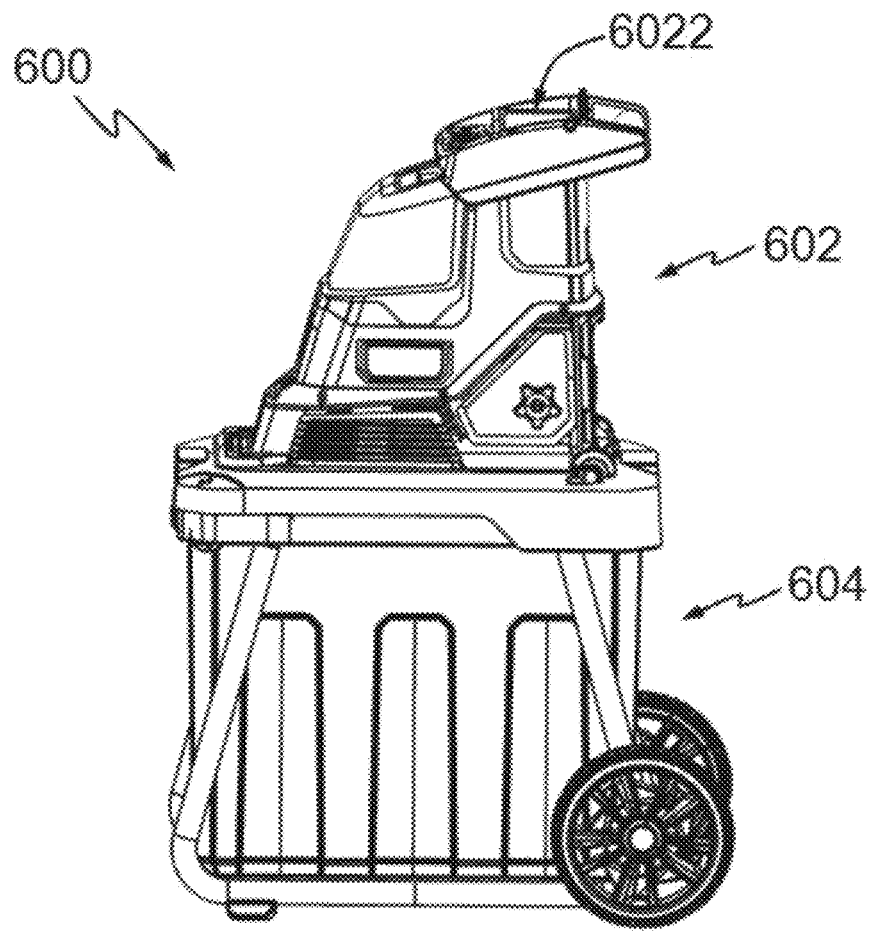
FIG. 6A shows a schematic diagram of a branch shredder according to some embodiments of the present invention.
Figure 6B:
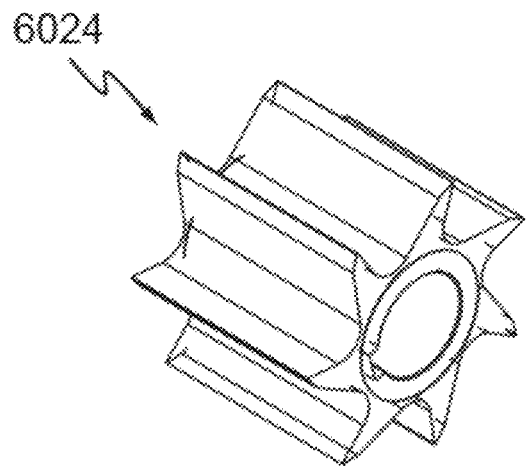
FIG. 6B shows a schematic diagram of a tool head of the branch shredder of FIG. 6A.

The alarm circuit 592 is used to send out an alarm signal in one or more of the states. The alarm signal is, for example, a visual signal (color, color combination or flashing), or a sound signal (pitch or length of different sounds, or a combination thereof), or a combination of the two. FIG. 6A shows a schematic diagram of a branch shredder according to some embodiments of the present invention. FIG. 6B shows a schematic diagram of a tool head of the branch shredder of FIG. 6A. The illustrated branch shredder 600 may be a specific implementation of the power tool 110 shown in FIG. 1. Other types of power tools are also possible.

As illustrated, the branch shredder 600 comprises a first part 602 and a second part 604. The first part 602 is provided with a tool head (e.g., a cutter 6024 illustrated in FIG. 6B), and a motor (not shown) for driving the tool head is also provided with a battery pack for supplying power to the motor on a housing of the first part 602. The second part 604 is illustrated as comprising a collection box. The material to be crushed, such as tree branches, enters a channel in the first part 602 from a feed port 6022, then reaches the cutter 6024, and is crushed by the cutter, and the crushed material falls into the second part 604. The feed sensor as illustrated in FIG. 4B may be arranged near the feed port 6022 for sensing the material such as tree branches entering the branch shredder 600. The feed sensor is, for example, one or more infrared sensors, microwave sensors, electromagnetic field sensors, etc., or a combination thereof.

The branch shredder 600 is provided with a control system (not shown). The control system may be, for example, one or more of the control systems illustrated and described with reference to FIGS. 1 to 5, or an appropriate combination thereof. The control system is used to acquire at least one parameter associated with the branch shredder 600 (e.g., a motor of the branch shredder 600), and based on the parameter, put the branch shredder 600 (or its motor) in different modes, such as a working mode or a standby mode, thereby saving power consumption, extending the service life of the branch shredder, improving operational safety, and so on.

Figure 7:
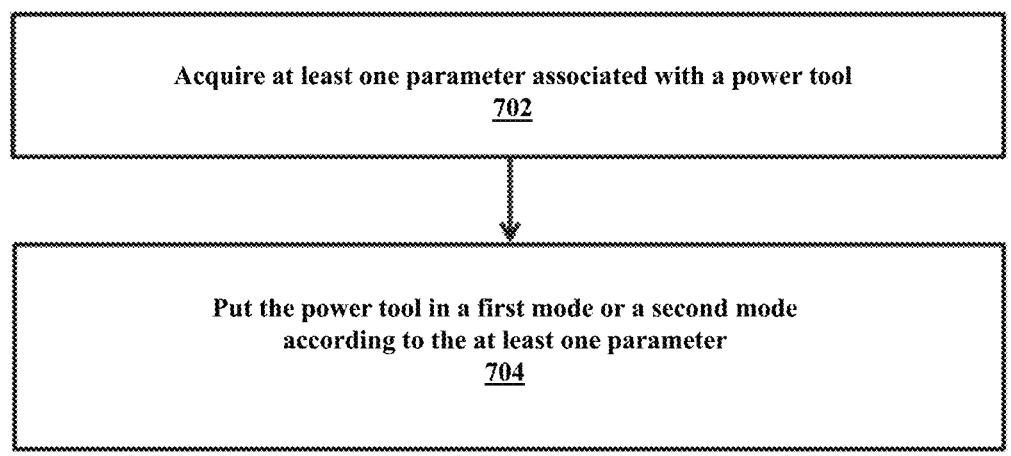
FIG. 7 shows a flowchart of a control method for a power tool according to some embodiments of the present invention.

FIG. 7 shows a flowchart of a control method for controlling a power tool according to some embodiments of the present invention. The control method may be one or more methods executed by one or more of the control systems illustrated and described with reference to FIGS. 1 to 5, or one or more methods executed by a combination of one or more of the control systems, or a combination of one or more methods.

At block 702, at least one parameter associated with the power tool is acquired. Taking a branch shredder as an example, at least one parameter associated with a motor of the branch shredder, such as a current drawn by the motor, an output power, a rotational speed, or a terminal voltage of a resistor associated with the motor, may be acquired.

At block 704, the power tool is put in a first mode or a second mode according to the at least one parameter. The first mode is, for example, a working mode, and the second mode is, for example, a standby mode. Taking the branch shredder as an example, the motor of the branch shredder is put in the working mode or the standby mode according to the comparison of the at least one parameter associated with the motor of the branch shredder and a corresponding parameter threshold. In some embodiments, a time value during which the corresponding parameter continues to meet a corresponding condition is also detected, and according to the comparison of the time value and a time threshold, it is determined to put the motor of the branch shredder in the working mode or the standby mode.

In the prior art, for example, when there is no load, the power supply to the power device (e.g., the motor) is usually turned off by the operator, and the power supply is triggered when the operation is needed. This usually needs additional manpower, which is inconvenient. Moreover, due to the limitation of the person's reaction speed, it is usually not fast enough. Rapidity is important in certain safety scenarios. According to the method of FIG. 7, the power tool can be automatically switched between modes. For example, the motor can automatically enter standby when it does not need to work, and automatically wake up when it needs to work. This is advantageous and desirable in many respects.

Figure 8:
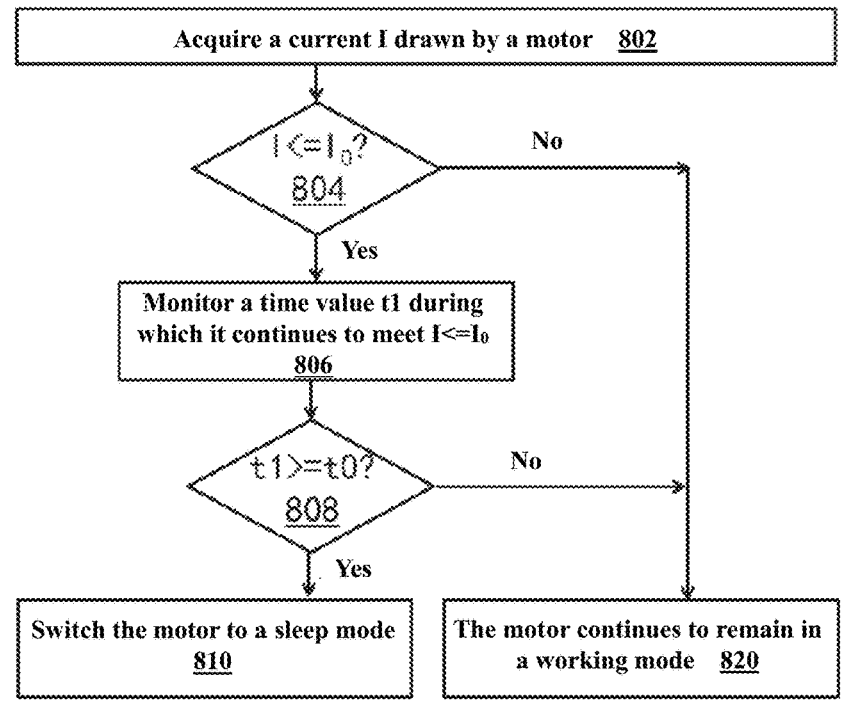
FIG. 8 shows a flowchart of a control method for a power tool according to other embodiments of the present invention, wherein the power tool is initially in a working mode.

FIG. 8 shows a flowchart of a control method for a power tool according to other embodiments of the present invention, wherein the power tool is initially in a working mode.

For illustrative purposes only, FIG. 8 takes the branch shredder as an example, and only illustrates the mode conversion based on the current of the motor of the branch shredder. Those skilled in the art, especially with reference to the above description, should understand that other parameters associated with the motor or a combination of one or more of the parameters may also be used as the basis for mode conversion. In addition, the ideas described with reference to this example may be applicable to one or more other power tools.

In FIG. 8, the motor is initially in the working mode. At block 802, the current I drawn by the motor is acquired. At block 804, the current I is compared with a current threshold $I_0$. The current threshold $I_0$ is, for example, in a range of 8 A to 50 A. For example, the current threshold $I_0$ is 8 A, 10 A, 20 A, 30 A, 40 A or 50 A. If the current I is greater than the current threshold $I_0$, then the method goes to block 820 in which the motor continues to remain in the working mode.

If it is determined at block 804 that the current I is less than or equal to the current threshold $I_0$, then the method goes to block 806 to monitor a time value t1 during which it continues to meet $I<=I_0$. At block 808, the time value t1 is compared with a time threshold value t0. t0 is, for example, in a range of 1 second to 300 seconds. For example, t0 is 1 second, 10 seconds, 30 seconds, 60 seconds, 120 seconds, 200 seconds, 250 seconds or 300 seconds. If t1 is less than t0, that is, the time during which the current I is less than or equal to the current threshold $I_0$ is not long enough, this means that it may be due to load state disturbance or state noise generated during operation, rather than truly a change to a no-load or low-load state. Then, the method goes to block 820 in which the motor continues to remain in the working mode.

If it is determined at block 808 that t1 is greater than or equal to t0, that is, the time during which the current I is less than or equal to the current threshold $I_0$ is long enough, this usually means that the motor has changed to the no-load or low-load state. Then, the method goes to block 810 in which the motor is switched to a standby mode to save electricity.

Figure 9:
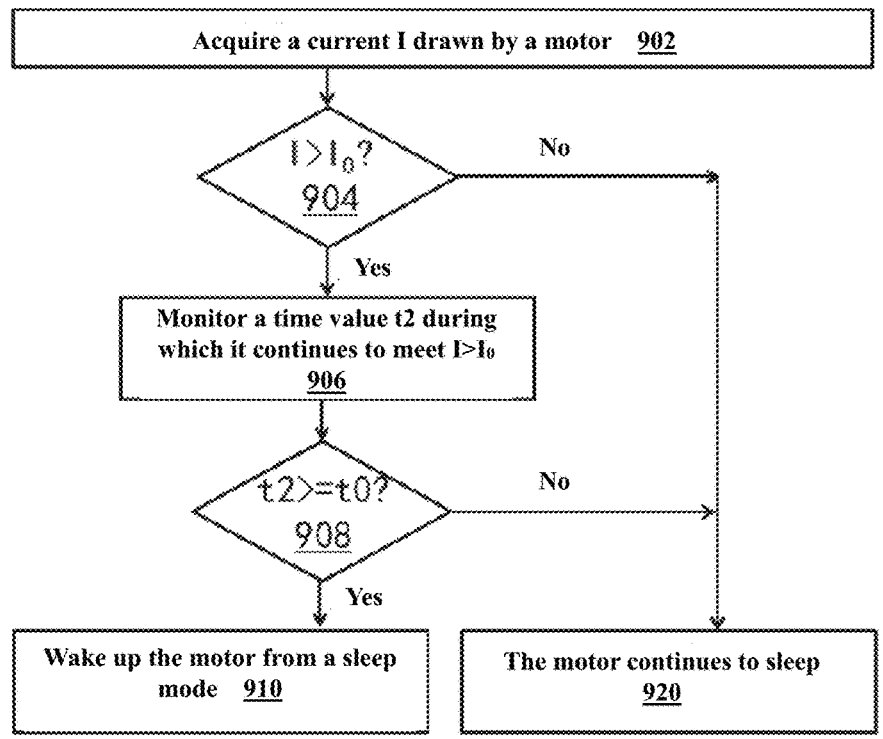
FIG. 9 shows a flowchart of a control method for a power tool according to still other embodiments of the present invention, wherein the power tool is initially in a standby mode.

FIG. 9 shows a flowchart of a control method for a power tool according to still other embodiments of the present invention, wherein the power tool is initially in a standby mode.

For illustrative purposes only, FIG. 9 takes the branch shredder as an example, and only illustrates the mode conversion based on the current of the motor of the branch shredder. Those skilled in the art, especially with reference to the above description, should understand that other parameters associated with the motor or a combination of one or more of the parameters may also be used as the basis for mode conversion. In addition, the ideas described with reference to this example may be applicable to one or more other power tools.

In FIG. 9, the motor is initially in the standby mode. At block 902, the current I drawn by the motor is acquired. At block 904, the current I is compared with a current threshold $I_0$. The current threshold $I_0$ is, for example, in a range of 2 A to 5 A. For example, the current threshold $I_0$ is 3 A. If the current I is less than or equal to the current threshold $I_0$, then the method goes to block 920 in which the motor continues to be on standby.

If it is determined at block 904 that the current I is greater than the current threshold $I_0$, then the method goes to block 906 to monitor a time value t2 during which it continues to meet $I>I_0$. At block 908, the time value t2 is compared with a time threshold value t0. t0 is, for example, in a range of 0.1 second to 1 second. For example, t0 is 0.5 seconds. If t2 is less than t0, that is, the time during which the current I is greater than the current threshold $I_0$ is not long enough, this may mean that it is due to load state disturbance or state noise generated during the standby process, rather than actually a change to a normal-load or high-load state, and thus the motor is not required to work. Then, the method goes to block 920 in which the motor continues to be on standby.

If it is determined at block 908 that t2 is greater than or equal to t0, that is, the time during which the current I is greater than the current threshold $I_0$ is long enough, this usually means that the motor has changed to a normal no-load or high-load state, and the motor is required to work. Then, the method goes to block 910 in which the motor is woken up from the standby mode and starts working.

According to the methods illustrated in FIGS. 8 and 9, the time value for the state parameter of the motor remaining in one state is taken into account, thereby avoiding or reducing misjudgement, and further increasing the accuracy and effectiveness of judging the load state. In addition, switching between modes or maintaining modes does not require the participation of people, and can be completed automatically, having operation convenience and rapidity.

Figure 10:
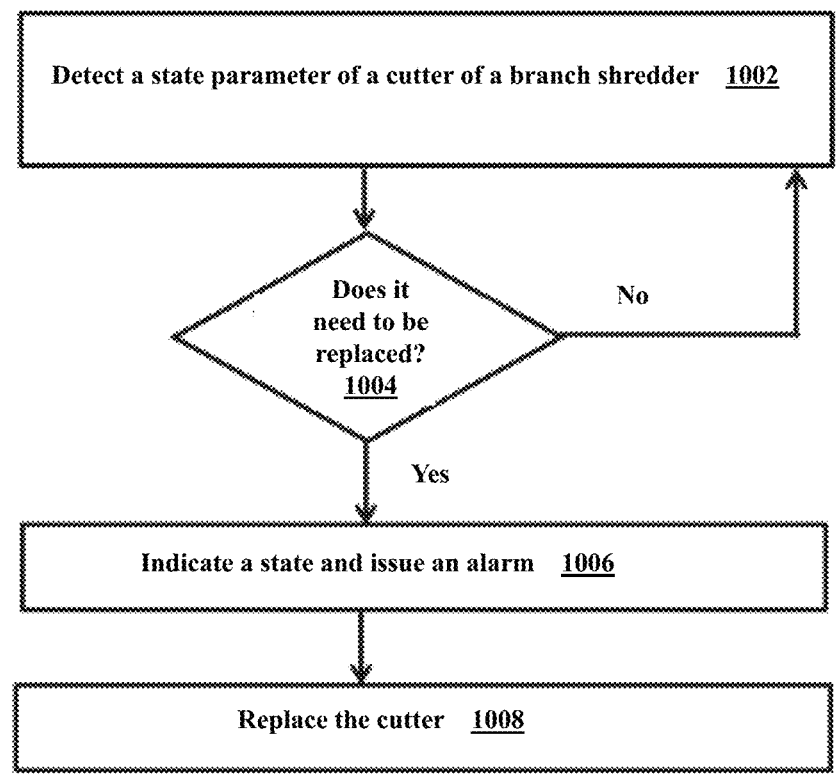
FIG. 10 shows a flowchart of a control method for a power tool according to still other embodiments of the present invention.

FIG. 10 shows a flowchart of a control method for a power tool according to still other embodiments of the present invention.

For illustrative purposes only, FIG. 10 takes the branch shredder as an example, and only illustrates condition monitoring of a cutter of the branch shredder. Those skilled in the art, especially with reference to the above description, should understand that the ideas described with reference to this example may be applicable to the monitoring of one or more other states of the branch shredder. In addition, the ideas described with reference to this example may be applicable to one or more other power tools.

At block 1002, a state parameter of the cutter of the branch shredder is detected. The state parameter can indicate a usage state, wear conditions or the like of the cutter. The state parameter may be, for example, a total number of operating revolutions, total operating mileage, total operating time or the like of the cutter. For example, the control system may comprise a circuit module for recording or calculating the total number of operating revolutions, total operating mileage, or total operating time of the cutter since its first use. The total operating mileage is, for example, the total number of revolutions multiplied by a length of one revolution of the cutter. The state parameter may be compared with a corresponding preset parameter threshold as a basis. For example, when the total number of operating revolutions is greater than a total-number-of-operating-revolutions threshold (for example, 10 million revolutions), this may indicate that the cutter needs to be replaced.

In some embodiments, in order to more accurately indicate when the cutter needs to be replaced, a driving voltage, current, power or the like of the cutter when in use may be considered. For example, in some embodiments, an appropriate function F may be constructed, wherein the function F is a function of one or more of the total number of revolutions, the total operating mileage, the total operating time, the driving power, the driving voltage, the driving current and the like, and then a calculated value of the function F is compared with a function threshold $F_0$. When F reaches $F_0$, this indicates that the cutter needs to be replaced.

At block 1004, it is determined whether the cutter needs to be replaced. The determination basis may be, for example, as described above, and other suitable criteria may also be anticipated. If it is determined that the cutter does not need to be replaced, then the method returns to block 1002 to continue monitoring the cutter. If it is determined that the cutter needs to be replaced, then the method goes to block 1006 to indicate a state and issue an alarm. For example, a beep may be issued to prompt the operator to replace the cutter. After that, the method goes to block 1008 to replace the cutter.

In some embodiments, when it is determined at block 1004 that the cutter does not need to be replaced, the detection is stopped. After a certain period of time such as one month, the detection will start again. In addition, some steps shown in FIG. 10 are merely optional or additional. For example, in some embodiments, only the wear state of the cutter is indicated, and no alarm is issued.

Those skilled in the art should understand that the embodiments herein are only for the purpose of illustrating the present invention, and are by no means limiting to the present invention.

In addition, one figure may show multiple elements. Those skilled in the art should understand that this is only for the purpose of simplicity and does not mean that each element is necessary. Those skilled in the art will understand that one or more elements in the same figure may be optional or additional elements.

Those skilled in the art should also understand that the above embodiments attempt to illustrate one or more ideas of the present invention from different aspects, and they are not isolated; instead, those skilled in the art may combine different embodiments in an appropriate way according to the above examples to obtain other examples of the technical solution.

Unless otherwise defined, the technical and scientific terms used herein have the same meanings as commonly understood by those ordinarily skilled in the art of the present invention. The implementations of the present invention are illustrated in non-limiting embodiments. On the basis of the embodiments disclosed above, various variations that can be conceived by those skilled in the art fall within the scope of the present invention.

The invention claimed is:

1. Control system for a normally-on power tool, the power tool comprising a tool head and a power device for providing the tool head with power, wherein the control system comprises:
    an acquisition circuit configured to be in electrical communication with the power device and used to acquire at least one parameter associated with the power device; and
    a control circuit configured to put the power device in a working mode with a first output power or a standby mode with a second output power according to the at least one parameter,
    wherein the acquisition circuit is configured to continuously acquire the at least one parameter of the power device in the working mode, and intermittently acquire the at least one parameter of the power device in the standby mode.

2. Control system according to claim 1, wherein the acquisition circuit comprises one or more of a current sensor, a voltage sensor, a power sensor, or a speed sensor, and the at least one parameter comprises one or more of a current, an output power, or a rotational speed of the power device.

3. Control system according to claim 1, wherein, in the working mode, the power device has a current in a range of 8 A to 50 A, an output power in a range of 230 W to 1050 W, and a rotational speed in a range of 30 RPM to 45 RPM.

4. Control system according to claim 1, wherein, in the standby mode, the power device has a current in a range of 2 A to 5 A, an output power in a range of 58 W to 144 W, and a rotational speed in a range of 15 RPM to 25 RPM.

5. Control system according to claim 1, wherein the control system further comprises a timing circuit configured to monitor a time value associated with the at least one parameter, and the control circuit puts the power device in the working mode or the standby mode according to the at least one parameter and the time value.

6. Control system according to claim 1, wherein the control system is configured to detect at least one state of the power tool that is different from the at least one parameter, and the control circuit is configured to switch the power tool from the standby mode to the working mode based on the at least one state.

7. Control system according to claim 1, wherein the control system is configured to detect at least one state of the power tool, and the control circuit is configured to switch the power tool from the standby mode to the working mode based on the at least one state before the at least one parameter changes.

8. Control system according to claim 1, wherein the control system further comprises a feed sensor configured to monitor whether a material enters a feed port of the power tool.

9. Control system according to claim 1, wherein the control system further comprises a load indicator for indicating a load capacity of the power tool.

10. Control system according to claim 9, wherein the control system is configured to cause the load indicator to indicate a low load capacity within a predetermined time when the power device starts to switch from the standby mode to the working mode, wherein the low load capacity is based on the current drawn by the power device.

11. Control system according to claim 9, wherein the control system is configured to cause the load indicator to indicate a low load capacity within a predetermined time from detection of the at least one state of the power tool by the control system, wherein the low load capacity is based on the current drawn by the power device.

12. Control system according to claim 1 wherein,
the control system is configured to detect one or more of the following items of the tool head of the power tool: total number of operating revolutions, total operating mileage, or total operating time; and
the control circuit determines whether the tool head needs to be replaced according to the detection of the tool head of the power tool.

13. Control system according to claim 12, wherein the control system further comprises an indication circuit configured to indicate the at least one state.

14. Control system according to claim 1, wherein the power tool is a branch shredder.

15. Control system according to claim 13, wherein the control system further comprises an alarm circuit configured to issue an alarm signal in one or more of the at least one state, wherein the alarm signal is a visual signal, a sound signal, or a combination of the two.

* * * * *